US006951254B2

(12) United States Patent
Morrison

(10) Patent No.: US 6,951,254 B2
(45) Date of Patent: Oct. 4, 2005

(54) SOIL MANIPULATING TOOL

(75) Inventor: Michael Joseph Morrison, Vic (AU)

(73) Assignee: ECompost Pty Ltd. (AU)

( * ) Notice: Subject to any disclaimer, the term of this patent is extended or adjusted under 35 U.S.C. 154(b) by 345 days.

(21) Appl. No.: 10/182,886

(22) PCT Filed: Jan. 29, 2001

(86) PCT No.: PCT/AU01/00080

§ 371 (c)(1),
(2), (4) Date: Aug. 1, 2002

(87) PCT Pub. No.: WO01/56359

PCT Pub. Date: Aug. 9, 2001

(65) Prior Publication Data

US 2003/0000141 A1 Jan. 2, 2003

(30) Foreign Application Priority Data

Feb. 3, 2000 (AU) .............................................. PQ5409

(51) Int. Cl.[7] .......................... E21B 10/44; A01G 25/14
(52) U.S. Cl. ...................... 172/376; 172/22; 47/1.01 R; 47/48.5
(58) Field of Search ............................ 47/1.01 R, 48.5; 172/376, 371, 21, 22; 175/384

(56) References Cited

U.S. PATENT DOCUMENTS

| 2,890,860 | A | * | 6/1959 | Smith | 173/140 |
| 3,375,885 | A | * | 4/1968 | Scott et al. | 175/26 |
| 3,391,544 | A | * | 7/1968 | Daczko | 405/241 |
| 4,579,180 | A | * | 4/1986 | Peetz et al. | 175/394 |
| 4,942,932 | A | * | 7/1990 | Bracewell | 175/323 |
| 5,241,782 | A | * | 9/1993 | McCarthy et al. | 47/29.1 |
| 5,365,693 | A | | 11/1994 | Van Wingerden et al. | |
| 5,441,118 | A | * | 8/1995 | Cruz, Jr. | 172/378 |
| 5,454,435 | A | * | 10/1995 | Reinhardt | 175/19 |
| 5,919,005 | A | * | 7/1999 | Rupiper | 405/244 |
| 6,033,152 | A | * | 3/2000 | Blum | 405/241 |
| 6,105,681 | A | * | 8/2000 | Williams | 172/378 |
| 6,119,787 | A | * | 9/2000 | Garcia | 172/25 |
| 6,161,625 | A | * | 12/2000 | Mati | 172/96 |

FOREIGN PATENT DOCUMENTS

| AU | A-38528/93 | 11/1993 |
| WO | WO90/06672 | 6/1990 |
| WO | WO 98/41697 | 9/1998 |

* cited by examiner

Primary Examiner—Jeffrey L. Gellner
(74) Attorney, Agent, or Firm—Fish & Richardson P.C.

(57) ABSTRACT

A soil manipulating tool is disclosed which has a handle (12) and a soil penetrating portion (14). The soil penetrating portion (14) is formed from a helical or spiral rod or wire (13) which defines a cavity (18). The rod or wire (13) may be hollow so that fertilizer or other liquid material can pass through the hollow rod wire (13) into the soil in which the tool is to be used. The tool may also include an abutment member for limiting the amount of penetration of the tool into the soil to facilitate churning up of the soil and a blade may also be provided across one of the spirals of the portion (14) to provide a chopping of soil so that a hole can be formed by removal of a plug of soil but at the same time leaving loosened soil at the bottom of the hole. The tool has particular application in aerating and manipulating composted material and the removal of composted material from a compost bin as well as garden applications for the formation of holes, and the aeration of soil facilitating plant growth.

6 Claims, 5 Drawing Sheets

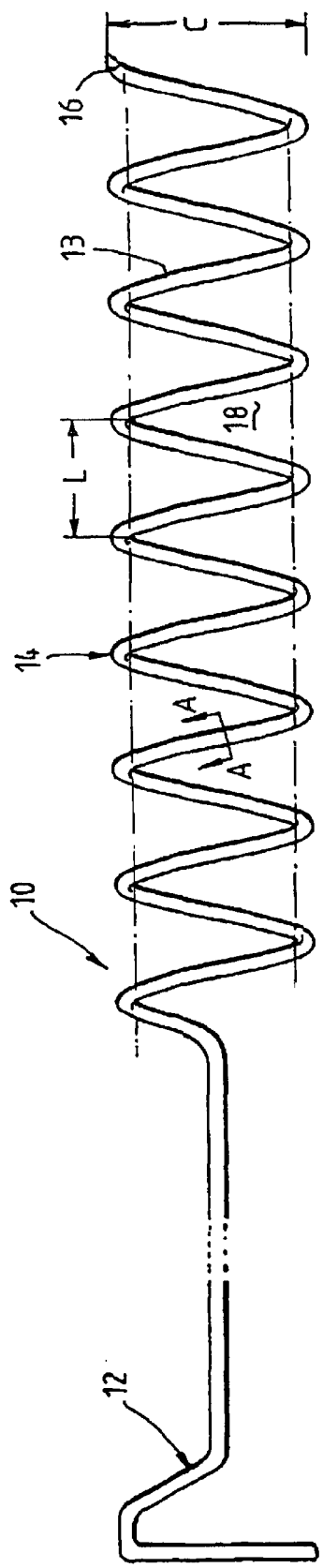
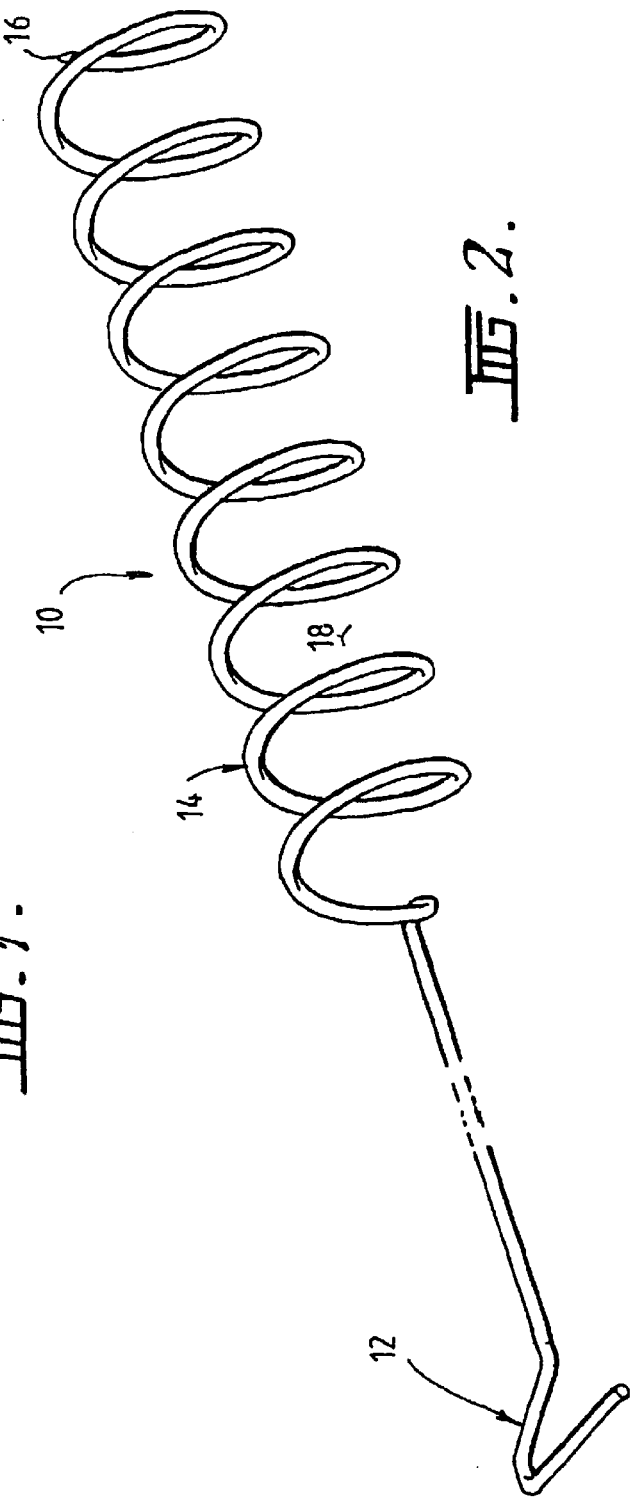

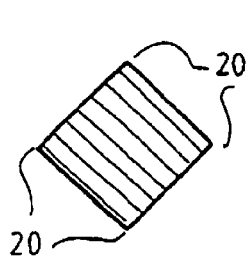
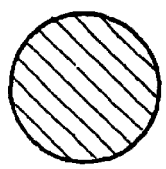
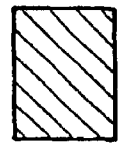
FIG. 3.    FIG. 4.    FIG. 5.
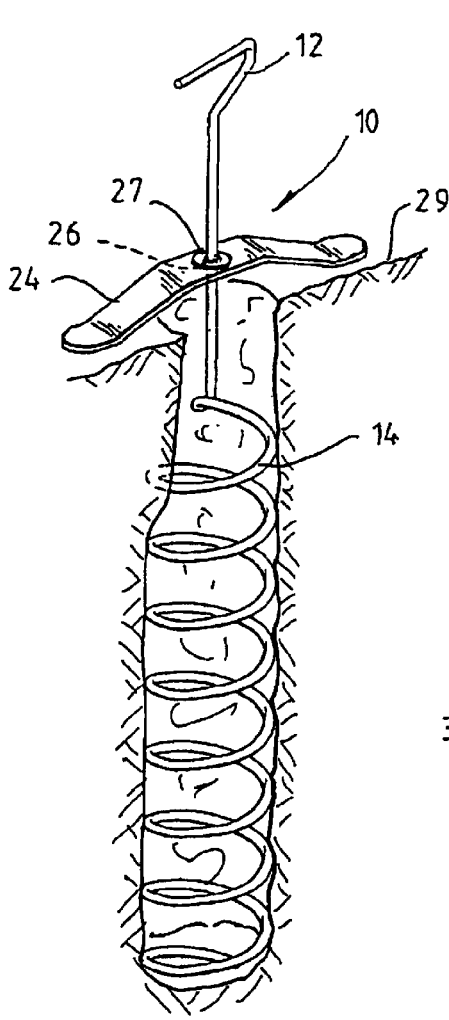
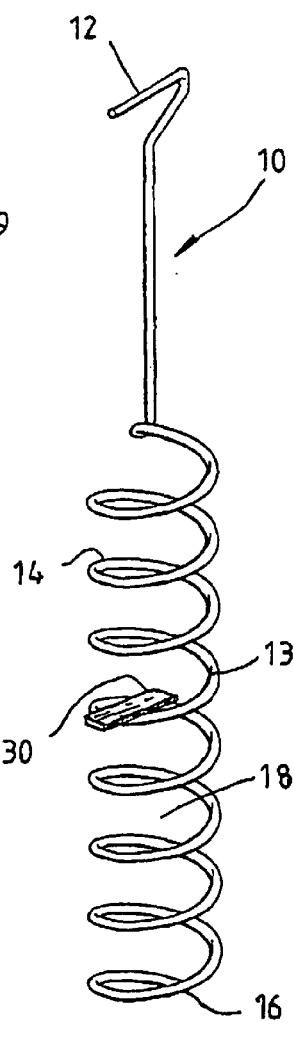
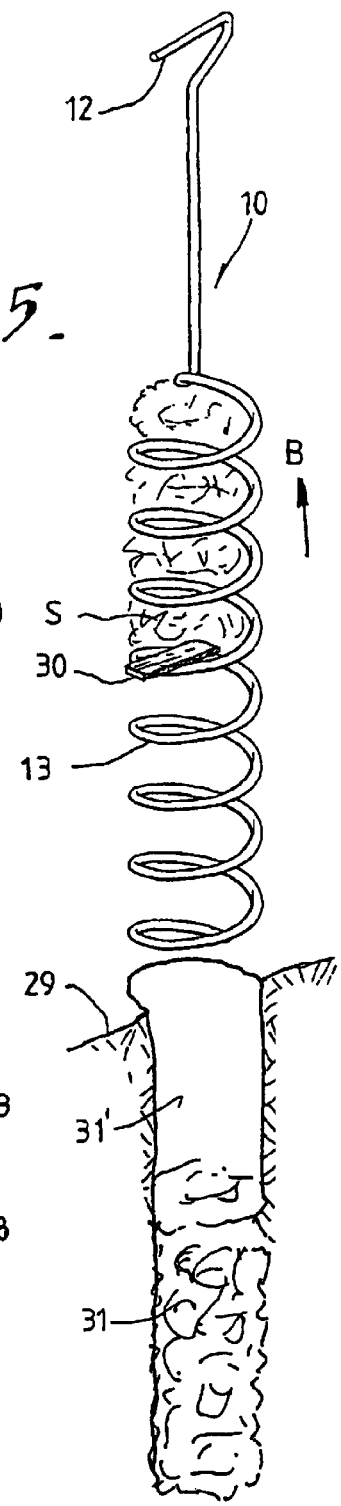
FIG. 6.    FIG. 7.    FIG. 8.

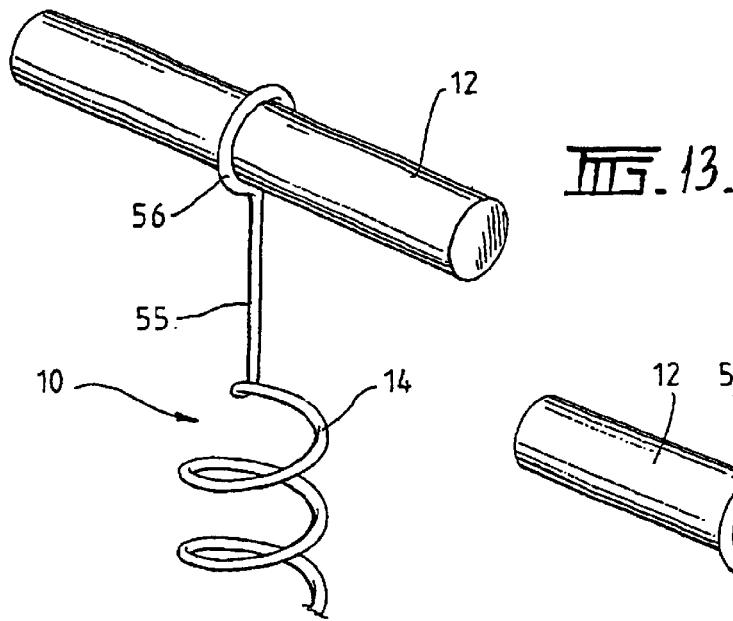
_FIG. 13._
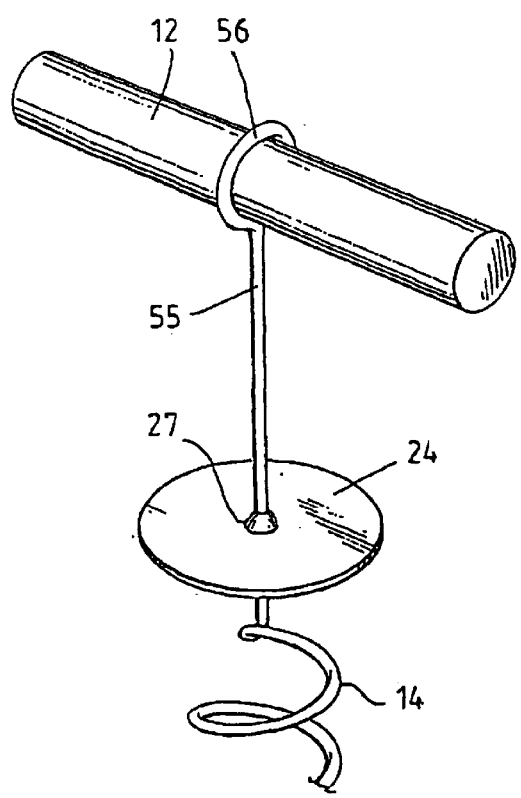
_FIG. 14._
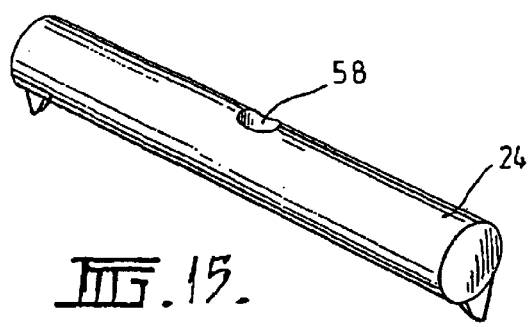
_FIG. 15._
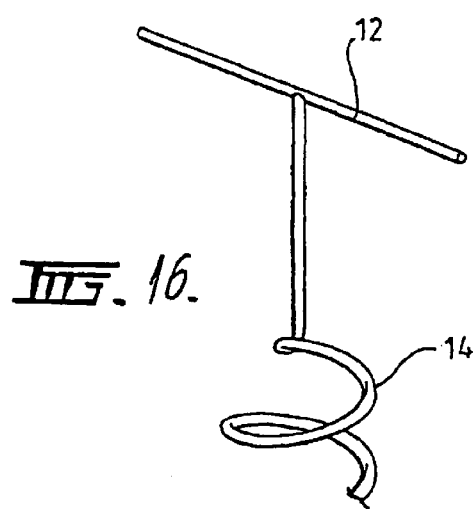
_FIG. 16._

SOIL MANIPULATING TOOL

FIELD OF THE INVENTION

This invention relates to a soil manipulating tool. As used in this specification and the accompanying claims the term "soil" includes other generally friable substances of a similar nature including compost.

The tool according to the present invention has a particular application, but not exclusive application in domestic gardening and removal of compost from a compost bin.

PRIOR ART

As is common, during the course of gardening it is often necessary to plant small plants or seedlings and to do so a relatively small hole needs to be dug. Conventional tools for digging such holes includes small spades and hoes.

During domestic composting of material it is common to compost material in a compost container which has an open bottom so that the composted material is simply left lying on the ground. In this situation the compost is generally easy to move from one place to another with a spade because the compost container can be removed from the composted material thereby leaving the composted material sitting on the ground.

In more recent times, compost containers which do not have an open bottom have been proposed. In these compost containers various mechanisms are installed in order to provide better composting of material. However, the removal of the composted material from these containers is somewhat more difficult. It is possible that the composted material can be tipped out of the container although, depending on the nature of the container, this may not be easy to do. Also, because of the height of this type of composting container, it is not easy to remove the composted material with a shovel or other conventional tool.

SUMMARY OF THE INVENTION

The present invention provides a soil manipulating tool for manipulating soil, including;

a soil penetrating portion comprising a helical or spiral member; and the helical or spiral member defining a substantially cylindrical cavity in which a plug of soil can locate, the cavity extending substantially the entire length of the soil penetrating portion.

According to this invention when the tool is rotated to drive the tool into the soil in generally screw fashion, a plug of the soil is accommodated in the cavity so that the plug of soil can be manipulated by the tool. The manipulation may comprise removal of the plug of soil from the body into which the tool is driven by simply withdrawing the tool from the body, or loosening or aerating the soil by rotating the tool in the soil so as to churn the soil which is located in the cavity.

In the preferred embodiment the tool includes a handle coupled to the soil penetrating portion. However, in other embodiments the tool could be configured for coupling to a power tool for driving the tool or to a power take off to a motor driven machine or vehicle.

In the preferred embodiment of the invention the helical or spiral member is formed from rod or wire. The cross-sectional shape of the rod or wire may be diamond shaped, circular shaped, or rectangular shaped.

In one embodiment of the invention the handle portion is formed integral with the soil penetrating portion and formed by bending one end of the soil penetrating portion into a handle shape.

In other embodiments the handle portion may be a separate component in the form of a rod or beam which is connected to the soil penetrating portion.

The tool may include an abutment portion disposed between the handle and the soil penetrating portion for abutting against a surface of the soil into which the tool is to be driven so that when the abutment member abuts the surface of the soil the tool can be rotated without further penetrating into the soil so as to facilitate churning up of the soil upon rotation of the tool. This embodiment of the invention has particular application for use with soils which are relatively hard or dense such as the ground. In situations where the soil is relatively loose such as the case with composting, churning of the soil can take place by simply rotating the tool and, by manual force preventing the tool from further winding into the soil so that a churning action is achieved rather than further penetration of the tool. If the soil is relatively hard continued rotation will simply tend to draw the tool into the soil in cork screw like fashion without any particular churning of the soil. However, since the abutment member will abut the surface of the soil this will prevent further penetration of the tool into the soil and continued rotation will therefore cause a churning up of the soil rather than further penetration.

In another advantageous embodiment of the invention the tool may include a blade member which extends across the cavity at one spiral of the helical or spiral soil penetrating portion. In this embodiment of the invention the blade has the effect of loosening soil within the cavity upon rotation of the tool whilst enabling a plug of soil above the blade to be removed upon extraction of the tool from the soil. This leaves a hole with a mass of loosened soil at the bottom of the hole which is therefore able to be used for the planting of seedlings or small plants.

In one embodiment of the invention the helical or spiral member may be hollow so that liquid can be applied to the tool and flow through the hollow member, the tool having an outlet opening arranged at an end of the hollow member opposite the handle portion so that the liquid can flow out of the hollow member.

This embodiment of the invention may also include a liquid pump which can be attached to the hollow tube to facilitate pumping of the fluid through the tool. This embodiment is advantageous in applying a liquid fertilizer or water to the soil as the soil is manipulated by the tool.

In one embodiment of the invention the tool may have a reinforced tip at its end remote from the handle to facilitate penetration of the tip of the tool into the soil.

The hole which allows exit of the fluid is preferably located in the rod or wire soil penetrating portion adjacent the reinforced tip.

In other embodiments the tool includes means for increasing the size of a bore created by the soil penetrating portion when the soil penetrating portion is wound through the soil.

A tip member is located on the helical or spiral member and the means may comprise a ledge on the tip member which has a maximum dimension which is greater than the maximum dimension of the helical or spiral member.

The means may also comprise a corrugated or wavelike section of the helical or spiral member.

The means may still further comprise providing the helical or spiral member with a pitch or wavelength at a portion of the helical or spiral member which is greater than the remainder of the pitch or wavelength of the helical or spiral member so as to create a spring effect at the portion of greater pitch or wavelength so that springing or oscillating movement creates an oversizing of the bore.

In another aspect the present invention is directed to a soil manipulation tool having a spiral shaped member forming a soil penetrating portion and defining an area in which a plug of soil may locate when said portion penetrates a soil mass, wherein rotation of the spiral shaped member assists it to penetrate said soil mass.

In a preferred embodiment the tool is suitable for removing the plug of soil from the soil mass by withdrawing the tool from the soil mass after having penetrated the soil mass, the plug of soil being supported within the spiral shaped member.

DESCRIPTION OF THE PREFERRED EMBODIMENTS

Preferred embodiments of the invention will be described, by way of example, with reference to the accompanying drawings in which;

FIG. 1 is a side view of a tool embodying the invention;

FIG. 2 is a perspective view of the tool of FIG. 1;

FIG. 3, FIG. 4 and FIG. 5 show various different cross-sections along the line A—A of FIG. 1;

FIG. 6 is a view of a further embodiment of the invention;

FIG. 7 is a view of a still further embodiment of the invention;

FIG. 8 is a view showing use of the embodiment of FIG. 7;

Figure 9:
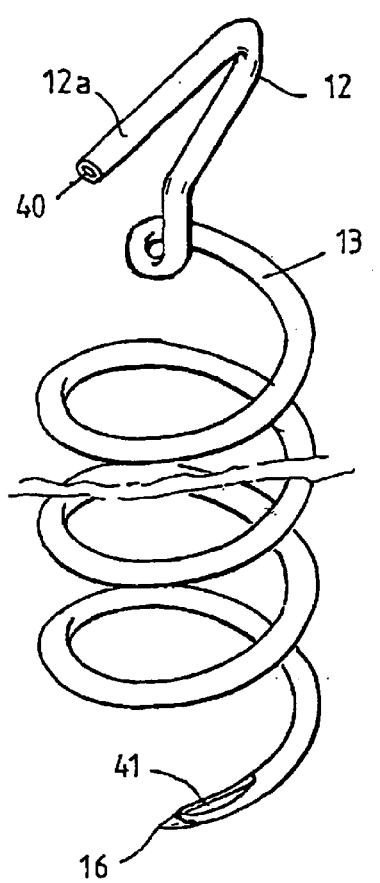
FIG. 9 is a still further embodiment of the invention.

FIGS. 13, 14, 15, 16, 17, and 18 show various different configurations of the tool according to still further embodiments of the invention.

With reference to FIGS. 1 and 2 a soil manipulating tool 10 is shown which has a handle 12 and a soil penetrating portion 14. The soil penetrating portion 14 is formed from a spiral or helical wire or rod 13. In the embodiment according to FIG. 1 the handle 12 is integral with the soil penetrating portion 14 and is formed by simply bending the wire or rod from which the soil penetrating portion 14 is formed into an appropriate configuration to act as a handle.

The helical or spiral rod or wire 13 which forms the soil penetrating portion 14 has a spiral of generally constant amplitude (i.e. in the direction of arrow C in FIG. 1) from the end of the portion 14 adjacent the handle 12 to tip 16 of the tool. The soil penetrating portion 14 defines a cylindrical cavity 18 identified by the dotted lines in FIG. 1.

In order to use the tool the tool is applied against the soil with the tip end 16 touching the soil and then is screw threaded into the soil so that the tool 10 winds into the soil. Because of the helical or spiral nature of the portion 14 the tool can be generally easily wound into the soil to manipulate the soil which may comprise either a churning up of the soil so as to aerate it or loosen it, or removal of a plug of the soil by simply extracting the tool in linear fashion in a direction opposite to that which the tool was wound into the soil. If it is desired to leave the plug of soil in the body of the soil and not remove it the tool can be removed by rotating the tool in the opposite direction to that which was used to screw the tool into the soil.

As is shown in FIGS. 3 to 5, the rod or wire member 13 which forms the spiral or helical portion 14 may have various different cross-sectional shapes. In FIG. 3 the cross-sectional shape is of diamond shape. This shape is particularly advantageous for use in generally hard soils because the apexes 20 of the diamond shape form cutting edges which facilitate cutting and penetration of the tool into the soil.

FIG. 4 shows a cross-section of circular configuration and FIG. 5 shows a rectangular shape.

FIG. 6 shows a further embodiment of the invention in which an abutment member 24 in the form of inverted u-shaped rod is located on the tool 10. The member 24 has a central hole 26 and the member 24 is located on the tool 10 by passing the portion 14 through the hole 26 and sliding the member 24 up to the position shown in FIG. 6. The handle 12 may include a stop 27 which can be in the form of a button, dimple or the like formed on the handle 12 so as to prevent movement of the abutment member 24 past the position shown in FIG. 6. This embodiment of the invention has particular application when it is desired to churn over soil rather than remove a plug, in soil which is relatively hard. When the tool 10 is screwed into the soil continued rotation of the tool 10, because of the relatively hard nature of the soil, is merely likely to continue drawing the tool into the soil in cork screw like fashion. However, by using the abutment member 24, when the abutment member 24 abuts surface 29 of the soil continued penetration of the tool 10 into the soil is prevented. Thus, continued rotation of the tool 10 rotates the spiral or helical portion 14 without further penetration therefore causing the soil at the periphery of the cylindrical cavity 18 to be churned up or broken up by movement of the wire or rod 13 through the soil upon rotation of the tool. The churning up of the soil therefore facilitates aeration of the soil or general loosening of hard and compacted soil.

In embodiments where the soil is relatively friable or soft such as the case with compost, an abutment member 24 may not be required because the tool can be conveniently held at a particular position after penetrating the compost and rotated without further penetration thereby aerating the compost if required.

The tool described with reference to FIGS. 1 to 6 also has application in removing plugs of composting material from a compost container. In compost containers which have a bottom and which can be difficult to empty, the composted material can be removed from the container by simply screwing the tool described in FIGS. 1 to 6 into the composted material so that a plug of the composted material forms in the cavity 18 and then extracting the tool in linear fashion in a direction opposite to that of penetration. This will cause a plug of the composted material which is located in the cavity 18 to be withdrawn from the composted mass. The plug can therefore be emptied into a bucket or container for transport to a location where it is used or, if the bin is at the location where the compost is to be used, the compost material can be simply shaken from the tool and dropped on the ground.

FIG. 7 shows a still further embodiment of the invention in which like reference numerals indicate like parts to those described with reference to FIGS. 1 to 6.

In this embodiment of the invention a blade 30 is located at one of the spirals of the spiral wire or rod 13 which forms the soil penetrating portion 14. As clearly shown in FIG. 7 the blade 30 extends across the cavity 18 defined by the spiral or helical portion 14. The blade 30 can be located across any one of the spirals which form the portion 14 but most preferably is located across one of the spirals at about the mid point of the portion 14 between the tip 16 and the handle 12.

This embodiment of the invention has particular application in digging holes into which small plants or seedlings are to be planted.

According to this embodiment of the invention the tool 10 is wound into the soil in the same manner as previously described. When the tool 10 has been wound into the soil to a sufficient depth to provide a hole of the required size the tool is rotated in that position. If the soil is particularly hard the abutment member 24 described with reference to FIG. 6 can be utilised in this embodiment of the invention. In view of the location of the blade 30 across the spiral which forms the portion 14, if an abutment member is required, the abutment member 24 can be located permanently in place between the handle 12 and the tool 14 at manufacture. Continued rotation of the tool 10, when it is in the soil will cause the soil in the vicinity of the blade 30 across the entire diameter of the cylindrical cavity 18, to be loosened by cutting action of the blade 30 as the blade rotates at that one position.

As shown in FIG. 8 when the tool 10 is removed from the surface 29 of the soil by withdrawing it in the direction of arrow B in FIG. 8, a hole 30 is left in the soil.

The hole 30 may be provided with loosened soil 31 by unscrewing the tool 10 from the hole 30 instead of withdrawing it in the direction of arrow B. The loosened soil 31 is provided by the soil being loosened by the part of the penetrating portion 13 below the blade 30 when the tool 10 is rotated in the hole 30. The soil above the blade 30 is removed as a plug upon extraction of the tool in the direction of arrow B and is identified by reference numeral S in FIG. 8 within the tool 10. Thus, a hole 30 is formed which has loosened soil at the bottom which is ideal for location of a plant to facilitate establishment of the root system of the plant in the loosened soil. Thus, according to this embodiment of the invention the hole 30 can be easily formed and provided with loosened soil generally in the one action of screwing the tool 10 into the soil and then extracting the tool 10 to remove the plug S and leave the hole 30 and the loosened soil 31.

Because of the location of the blade 30 across the cavity 18, the blade will act to hold the soil above the blade within the cavity as the tool is unwound rather than simply leaving the soil within the cavity in situ upon rewinding of the tool. Thus, this embodiment also provides the alternative of being able to withdraw the plug of soil S by unwinding the tool from the soil should that be necessary or desirable.

FIG. 9 shows a still further embodiment of the invention in which the rod or wire 13 is hollow and provided with an As shown in FIG. 8 when the tool 10 is removed from the surface 29 of the soil by withdrawing it in the direction of arrow B in FIG. 8, a hole 30 is left in the soil.

The hole 30 is provided with loosened soil 31 at the bottom of the hole which has been loosened and chopped by the blade 30 when the tool 10 was rotated in the hole 30. The soil above the blade 30 is removed as a plug upon extraction of the tool in the direction of arrow B and is identified by reference numeral S in FIG. 8 within the tool 10. Thus, a hole 30 is formed which has loosened soil at the bottom which is ideal for location of a plant to facilitate establishment of the root system of the plant in the loosened soil. Thus, according to this embodiment of the invention the hole 30 can be easily formed and provided with loosened soil generally in the one action of screwing the tool 10 into the soil and then extracting the tool 10 to remove the plug S and leave the hole 30 and loosened soil 31.

According to the embodiment of FIG. 8 the plug of soil can be moved by extracting the tool 10 in linear fashion as previously describing. However, also according to this embodiment of the invention the plug above the blade 30 can be removed by rotating the tool 10 in the opposite direction to that which was used to drive the tool 10 into the soil. Because of the location of the blade 30 across the cavity 18, the blade will act to hold the soil above the blade within the cavity as the tool is unwound rather than simply leaving the soil within the cavity 18 in situ upon rewinding of the tool. Thus, this embodiment also provides the alternative of being able to withdraw the plug of soil S by unwinding the tool from the soil should that be necessary or desirable.

FIG. 9 shows a still further embodiment of the invention in which the rod or wire 13 is hollow and provided with an inlet opening 40 at end 12a of the handle 12 and an outlet opening 41 adjacent tip 16. According to this embodiment of the invention liquid material such as fertilizer or water can be applied to the inlet 40 and flow through the hollow wire or rod 13 and exit the hole 41 so as to supply fertilizer to the soil during the course of manipulating the soil either to loosen it or aerate it, or during the course of removal of a plug to form a hole as in the embodiment of FIG. 8. This embodiment has particular advantage in locating water or fertilizer beneath the root structure of a plant in the ground by screwing the tool 10 over the plant so that the tip will be generally below the level of the root structure and then applying the fertilizer through the hollow wire or rod 13 so that the fertilizer (or for that matter water) is located beneath the root structure to motivate the root structure to penetrate further into the soil to seek water or fertilizer. In the embodiment of FIG. 9 the tool 10 may also be provided with a reinforced tip 16 which is formed from soil material. The outlet opening 41 is provided in the hollow portion of the wire or rid 13 adjacent the reinforced tip 16.

Figure 10:
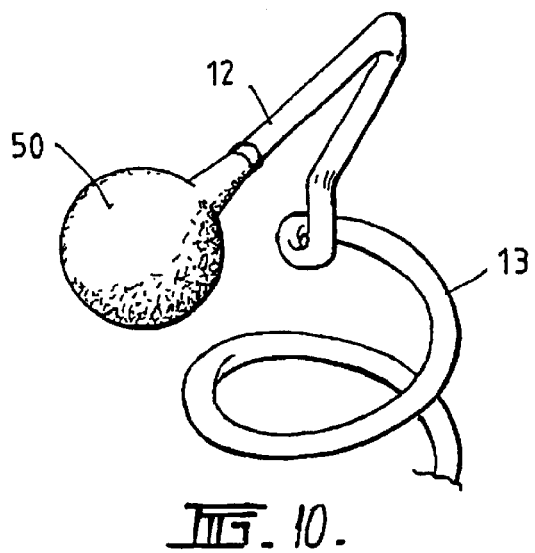
FIG. 10 is a view of a modification to the embodiment of FIG. 9.

FIG. 10 shows a modification to the embodiment of FIG. 9 in which a pump 50 is applied to the inlet 40 so as to facilitate the forcing of the liquid material through the hollow rod or wire 13 and out of the outlet opening 41. The pump 40 may simply be a resilient rubber or plastic bulb or the like which is squeezed so as to apply pressure to the hollow tube 13 so as to force the material in the hollow tube 13 through the tube and out of the outlet opening 41.

Figure 11:
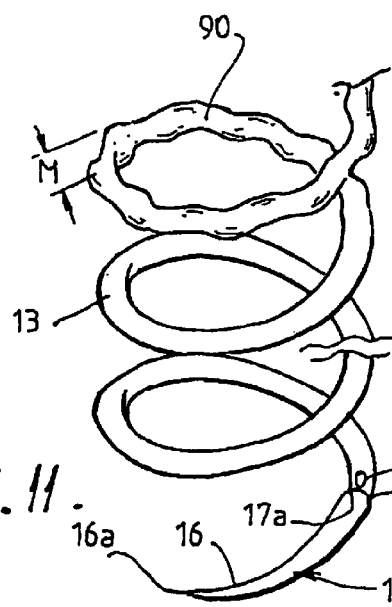
FIG. 11 is a modified form of the embodiment of FIG. 9.

FIG. 11 shows a modification to the tip 16 used in FIG. 9. The tip configuration shown in FIG. 11 may be used with a tool which has a hollow rod or wire 13 or which is made with a soil rod or wire 13. In this embodiment the tip 16 is formed on a relatively long tip member 17 which may have a length of up to 30 cm. The tip member 17 is connected to the rod or wire 13 by welding or any suitable method and diverges outwardly to end 17a of the tip member 17. The end 17a of the tip member 17 is provided with a shoulder or ledge 80 which projects outwardly from the member 13 so as to have a maximum dimension in a direction radial with respect to the rod or wire member 13 which is greater than the maximum dimension of the rod or wire member 13.

The tip member 17 has particular application in soils which are relatively hard and provides a strong tip 16 which is pointed so as to enable easier penetration into the ground. Because the ledge 80 is wider than the greatest dimension of the rod or wire 13, the bore B (shown in dotted lines in FIG. 6) created as the tip member 17 penetrates the ground, will be slightly greater than the size of the wire or rod 13 thereby reducing drag on the wire or rod 13 and thereby making it easier to penetrate the entire tool into the soil.

Although in the embodiment shown the tip member 17 is of a length in the order of 30 cm it is also possible to configure the tip member 17 to be much shorter of, for example, 30 mm. If it is desired to maintain the bore B, which is drilled when the tool 10 is screw threaded into the ground, as small as possible, the ledge 80 is omitted so the tip member 17 has a maximum dimension which is equal to the wire or rod 13 and has a smooth transition into the rod or wire 13.

In a still further embodiment, as show in FIG. 11, part of the rod or wire member 13 may be provided with a corrugated or wave like configuration represented by reference numeral 90 shown in FIG. 11. According to this embodiment, when the tool is screw threaded into the soil the corrugated or wave section 90 will force an oversizing of the bore B which is formed as the tool screws threads into the soil. In this embodiment the section 90 provides a larger dimension as shown by arrow M in FIG. 11 and will create a larger bore. Once again, the part of the rod or wire 13 which is located behind the section 90 will therefore travel through a larger bore thereby decreasing the amount of drag and making it easier for the tool to penetrate the soil. The section 90 should be provided as close to the tip 16 as is possible so that the maximum amount of reduction in drag can be provided.

Figure 12:
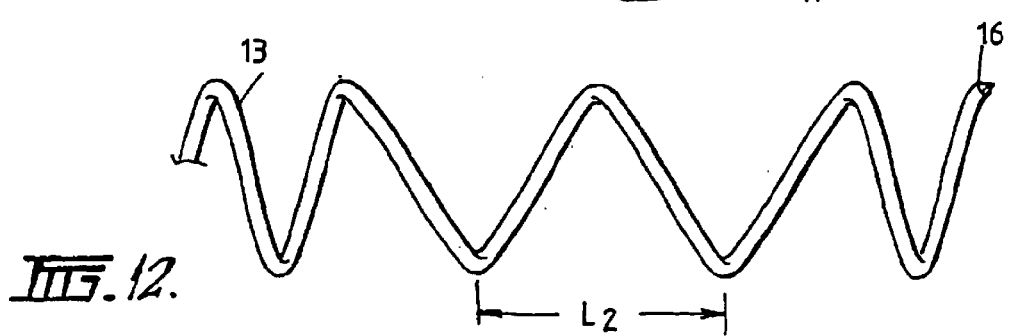
FIG. 12 shows a further embodiment.

In a still further embodiment, shown in FIG. 12, the oversizing can be performed by providing a pitch or wavelength of the spirals of a different magnitude. In the embodiment shown in FIG. 1 the pitch or wavelength (shown by arrow L) of the spirals of the rod or wire 13 is constant along the length of the soil penetrating portion 14. If the pitch or wavelength is increased (as shown by distance L2 in FIG. 12) at one of the spirals adjacent the tip 16 a springing or oscillating movement of the soil penetrating 14 can be produced as the tool is forced into the soil. This will have the tendency to make the bore created by passage of the wire or rod 13 through the soil, somewhat larger because of the slight back and forward movement of the wire on rod 13 as it penetrates the ground. This will also have the tendency to reduce drag because of the increased size of the bore B as the tool penetrates the ground.

FIGS. 13 to 19 show various other arrangements of the invention.

In FIG. 13 the handle 12 is formed from a straight rod or beam of wood or metal material and the portion 14 has a straight extension section 55 having an eye 56 at its free end into which the handle 12 is inserted. The handle 12 can be secured in place by any suitable manner so that it is permanently connected to the eye 56.

FIG. 14 shows an embodiment in which the abutment member 24 is in the form of a disc.

FIG. 15 shows an abutment member 24 which is in the form of a generally straight rod having an opening 58 facilitating location of the member 24 on the tool 10.

FIG. 16 shows an embodiment in which the handle 14 is generally in the form a straight beam or rod formed integral with the portion 14.

Figure 17:
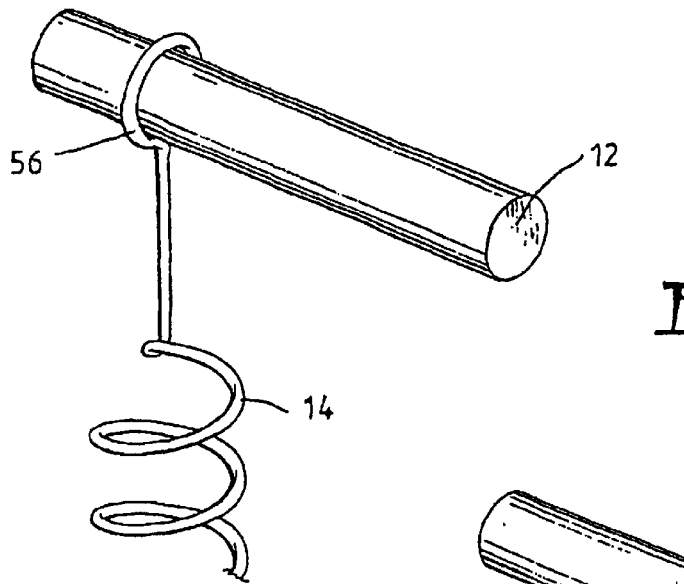

FIG. 17 shows an embodiment which is similar to FIG. 12 expect that the handle 12 is intended to be removable from the eye 56.

Figure 18:
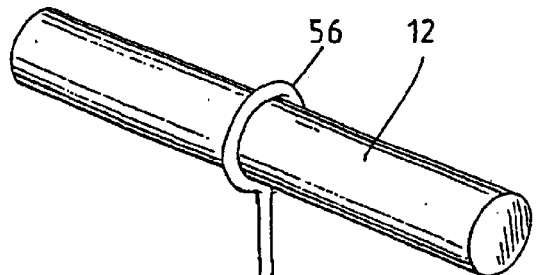

FIG. 18 shows an embodiment in which the abutment disc 24 is provided with a slot 60 so as to facilitate location of the disc 24 onto the tool 10.

Figure 19:
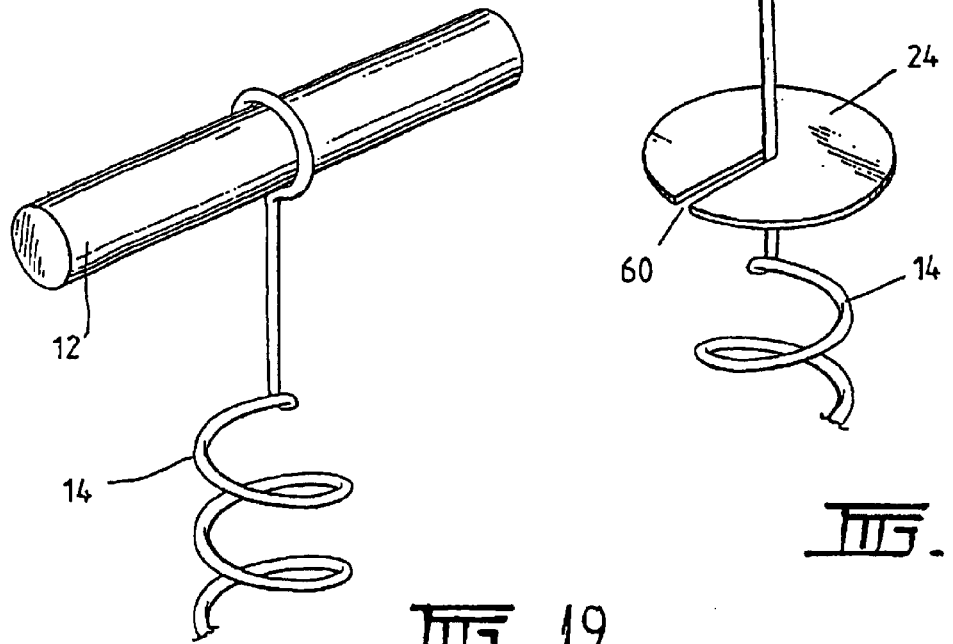

FIG. 19 is simply shows an embodiment in which the helical portion 14 is wound in the opposite direction to that in the previous embodiments.

The preferred embodiments of the invention therefore show tools which have great application in the manipulation of soil including the removal of compost from a compost bin, the aeration of compost and soil, and the formation of holes having loosened soil at the bottom for planting plants. The tool can also be used in environments close to small plants or indeed, located over small plants in order to aerate or loosen soil around the root structure of the plants. Because of the helical or spiral nature of the soil penetrating portion 14 the penetration of the portion 14 into the soil is not likely to cut or sever the roof structure but simply wind around the root structure and loosen the soil about the root structure while at the same time supplying some aeration to the root structure. Thus, the tool can be used without fear of damaging the plant.

In the preferred embodiment of the invention the tool is preferably of length about 40 cm to 60 cm and the rod wire member 13 has a largest dimension in cross-section of between 3 mm and 8 mm. The amplitude of the helical spiral is approximately 20 mm to 80 mm.

The claims defining the invention are as follows:

1. A soil manipulating tool for manipulating soil, including;

a soil penetrating portion comprising a helical or spiral member;

the helical or spiral member having an inner surface defining a substantially cylindrical cavity in which a plug of soil can locate, the cavity extending substantially the entire length of the soil penetrating portion; and the helical or spiral configuration of the soil penetrating portion having a substantially constant amplitude along the soil penetrating portion and the soil penetrating portion having a tip which terminates on the constant amplitude without extending into the cavity, said helical or spiral member being a free-standing, unsupported member.

2. The tool of claim 1 wherein the spiral or helical member is formed from rod or wire.

3. The tool of claim 2 wherein the cross-sectional shape of the rod or wire is diamond shaped, circular shaped, or rectangular shaped.

4. A soil manipulating tool for manipulating soil, including;

a soil penetrating portion comprising a helical or spiral member;

the helical or spiral member having an inner surface defining a substantially cylindrical cavity in which a plug of soil can locate, the cavity extending substantially the entire length of the soil penetrating portion; and the helical or spiral configuration of the soil penetrating portion having a substantially constant amplitude along the soil penetrating portion and the soil penetrating portion having a tip which terminates on the constant amplitude without extending into the cavity, said helical or spiral member being a free-standing, unsupported member, wherein the tool includes means for increasing the size of a bore created by the soil penetrating portion when the soil penetrating portion is wound through the soil.

5. The tool according to claim 4 wherein them means comprises providing the helical or spiral member with a pitch or wavelength at a portion of the helical or spiral member which is greater than the remainder of the pitch or wavelength of the helical or spiral member so as to create a spring effect at the portion of greater pitch or wavelength so that springing or oscillating movement creates an oversizing of the bore.

6. A soil manipulating tool for manipulating soil, including:
 a soil penetrating portion comprising a helical or spiral member;
 the helical or spiral member having an inner surface defining a substantially cylindrical cavity in which a plug of soil can locate, the cavity extending substantially the entire length of the soil penetrating portion, said helical or spiral member being a free-standing, unsupported member; and
wherein the helical or spiral member has a pitch or wavelength at a portion of the helical or spiral member which is greater than the remainder of the pitch or wavelength of the helical or spiral member so as to create a spring effect at the portion of greater pitch or wavelength.

* * * * *